United States Patent
Harrison et al.

(10) Patent No.: US 7,424,100 B2
(45) Date of Patent: Sep. 9, 2008

(54) PREPAID TELEPHONY SYSTEM AND METHOD OF ACTIVATING A PREPAID TELEPHONY ACCOUNT

(75) Inventors: Donna M. Harrison, San Antonio, TX (US); Larry B. Pearson, San Antonio, TX (US)

(73) Assignee: AT&T Intellectual Property L.L.P., Reno, NV (US)

( * ) Notice: Subject to any disclaimer, the term of this patent is extended or adjusted under 35 U.S.C. 154(b) by 1048 days.

(21) Appl. No.: 10/714,492

(22) Filed: Nov. 14, 2003

(65) Prior Publication Data

US 2005/0105704 A1 May 19, 2005

(51) Int. Cl.
*H04M 15/00* (2006.01)
(52) U.S. Cl. .............................. 379/114.2; 379/114.15; 379/114.17; 379/121.01; 379/127.01
(58) Field of Classification Search ................. 379/111, 379/114.1, 114.16, 114.17, 114.2, 114.28, 379/115.01, 115.02, 121.01, 121.06, 127.01, 379/127.06, 114.15
See application file for complete search history.

(56) References Cited

U.S. PATENT DOCUMENTS

| | | | | |
|---|---|---|---|---|
| 5,621,787 A | * | 4/1997 | McKoy et al. | ......... 379/121.06 |
| 5,991,376 A | * | 11/1999 | Hennessy et al. | ......... 379/114.1 |
| 6,195,422 B1 | * | 2/2001 | Jones et al. | ............. 379/127.05 |
| 6,529,593 B2 | | 3/2003 | Nelson | |
| 6,990,182 B2 | * | 1/2006 | Nelson | ..................... 379/114.2 |
| 6,999,569 B2 | * | 2/2006 | Risafi et al. | ............. 379/144.01 |
| 2002/0039907 A1 | | 4/2002 | McKenna et al. | |
| 2002/0098828 A1 | | 7/2002 | Wakil et al. | |
| 2003/0001005 A1 | | 1/2003 | Risafi et al. | |
| 2003/0043984 A1 | | 3/2003 | Lauzon | |
| 2003/0086548 A1 | | 5/2003 | Nelson | |

* cited by examiner

*Primary Examiner*—Binh K Tieu (57) ABSTRACT

In one particular embodiment, the disclosure is directed to a method of activating a prepaid telephony account. The method includes receiving a call from a caller at a prepaid service destination address identified by a prepaid calling card; receiving a prepaid card number of the caller; receiving a destination number; receiving an origination address of the caller; providing a message to the caller including an offer to associate a prepaid account corresponding to the prepaid calling card with the origination address of the caller; receiving a response to the message from the caller; and associating a long distance service code with the origination address of the caller based on the response to the message.

19 Claims, 9 Drawing Sheets

PREPAID TELEPHONY SYSTEM AND METHOD OF ACTIVATING A PREPAID TELEPHONY ACCOUNT

TECHNICAL FIELD OF DISCLOSURE

This disclosure, in general, relates to prepaid telephony systems and methods of activating prepaid telephony accounts.

BACKGROUND

Prepaid calling cards and other prepaid telephony services are widely used as a budgeting tool or by consumers lacking credit worthiness. Certain prepaid calling cards have been customized to provide rates that are advantageous for particular types of use. For example, consumers may purchase prepaid calling cards having rate plans adapted for state-to-state long distance calling. In another example, consumers may purchase cards having rate plans enhanced for calling specific foreign countries, such as, Mexico.

Despite their mobility, prepaid calling plans are most frequently used at a users or a consumer's residence. According to some market studies, a majority of long distance calls made using a prepaid calling card services are made from the home of the consumer.

In response to the size of the prepaid calling card market, an abundance of calling card providers has surfaced. Each of these calling card providers may provide one or more calling cards having specific plan enhancements. In such a market, it is often difficult for any one calling card provider to encourage customer loyalty. This lack of customer loyalty increases marketing costs, thereby increasing the cost for providing the calling card service.

Some calling card service providers attempt to pass this cost onto consumers by charging additional fees. For example, some calling card service providers charge a weekly maintenance fee to calling card accounts. Other service providers may charge a fee to initially place a call. In another example, service providers may charge a higher fee for time used at the beginning of a call and a low fee for later minutes. In a further example, service providers may charge a flat fee for a specified length of the call, such as the first 10 minutes, and charge a lower rate for use in excess of the specified call length. Each of these methods may be confusing and upsetting to consumers, further exacerbating the problem of low customer loyalty. As such, an improved prepaid system and method would be desirable.

DETAILED DESCRIPTION OF THE DRAWINGS

Figure 1:
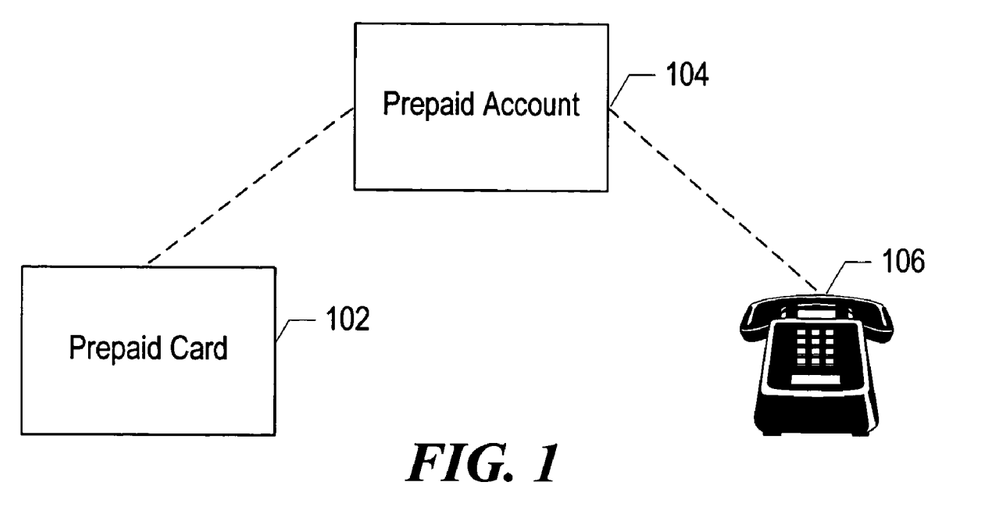
FIG. 1 depicts an exemplary embodiment of a prepaid calling system.

Referring to FIG. 1, a prepaid enabled telephony system is illustrated. The system includes a prepaid card 102, prepaid account 104, and end subscriber telephone device 106. The prepaid card may be a wallet sized card in the form of a credit card or similar type device that stores prepaid card information. Alternatively, the prepaid card may be a credit card shaped plastic card with prepaid numeric information printed on the front or back of the card. In addition, the prepaid card may be branded based on a service provider offering a prepaid telephony service. The prepaid account 104 may be implemented as data stored in a computer memory. The data may include the prepaid account balance, which may be represented in available minutes in or available fees for use by an owner or user of the prepaid card 102. The prepaid account may be incorporated within a telephony service such as a long distance service offered through use of an end-subscriber device such as the illustrated telephone device 106.

Figure 2:
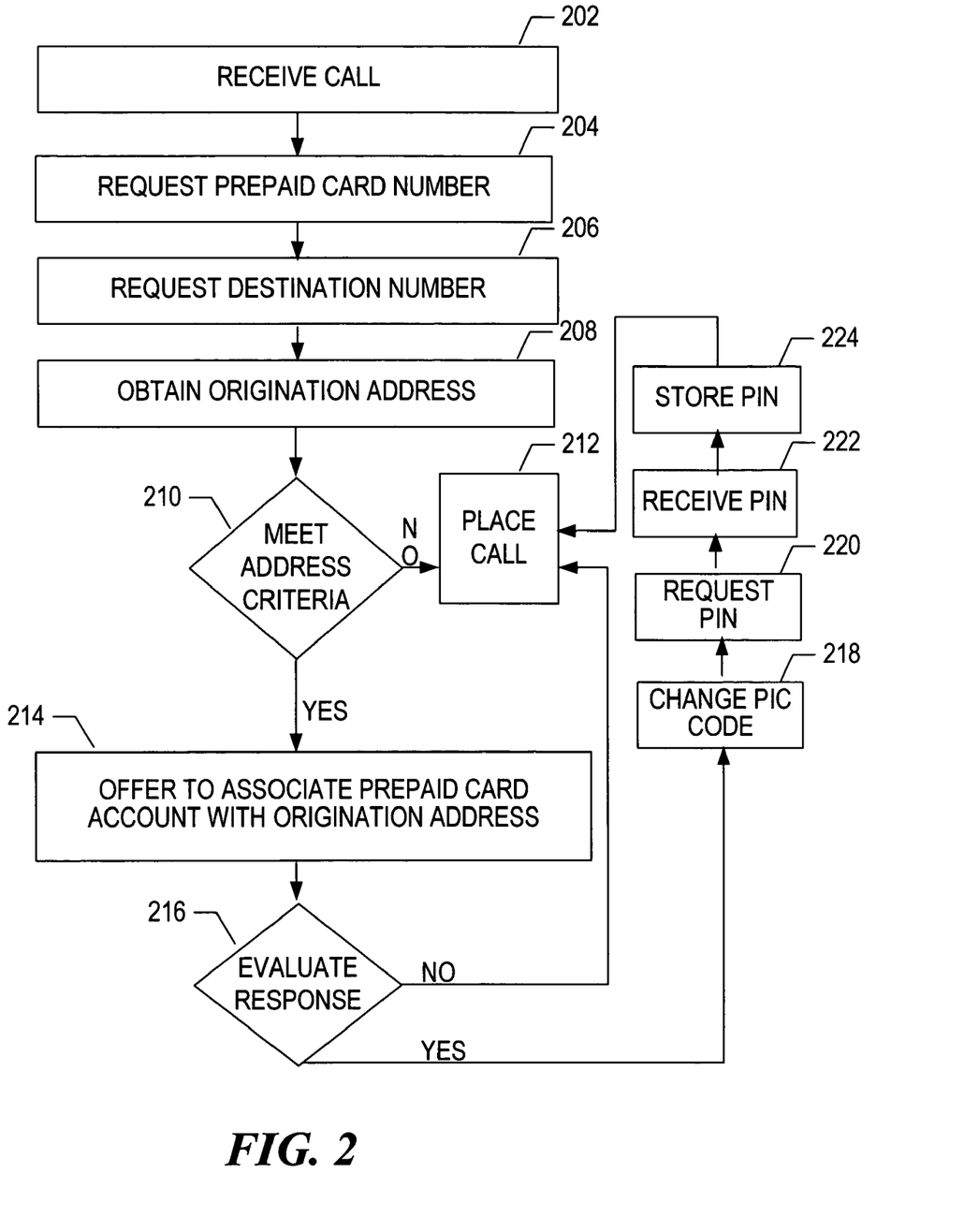
FIGS. 2, 3, 4, 5, 6, and 7 depict exemplary methods for use in conjunction with a prepaid calling card system.

Referring to FIG. 2, a method of providing a prepaid service is illustrated. The method includes a step of receiving a call from a caller at a prepaid service destination address identified by prepaid calling card, as shown at step 202. A prepaid card number may be requested, as shown at step 204. This request may be in the form of an automated prompt, such as a computer-generated message from an interactive voice response telephony unit. Similarly, a destination number may be requested as shown at step 206. The origination address of the caller is then received at 208. The origination address may be a telephone number, such as a subscriber's home phone number or other similar identifying address. At decision step 210, the origination address compare to an address criteria. The address criteria may include restrictions on available address such as whether the address is a resident or whether the address is at a pay phone. At step 214, a offer is made to the caller to associate a prepaid calling card account with the origination address. The offer may be made by a voice prompt unit as with the other message prompts described above. Alternatively, the offer may be made by a live human operator using a call center interconnected into the call path. At decision step 216, the response to the offer is evaluated. If the evaluation response is no, then a call is placed as at step 212. If the response to the offer is yes, then processing continues to step 218 where a PIC code is changed. In addition, the caller may request a PIN at 220, receive a PIN at 222, and may store the PIN for future reference at 224. Thereafter, the call is placed at 212. In the scenario where the address criteria at decision step 210 is not met, then a call is placed at 212 without making the prepaid card offer. The call placed at step 212 may be a long distance call from a caller located at the origination address to a remote telephony connection identified by the destination number. In addition, the prepaid card number requested at step 204, may be a prepaid access card such as a toll free number printed on the front of a prepaid calling card. The above-described prepaid method of operation describes a first use of a prepaid calling card. For subsequent use, the change in PIC code at step 218 may be used for call routing for subsequent long distance calls where credit is obtained through use of the prepaid account.

Figure 3:
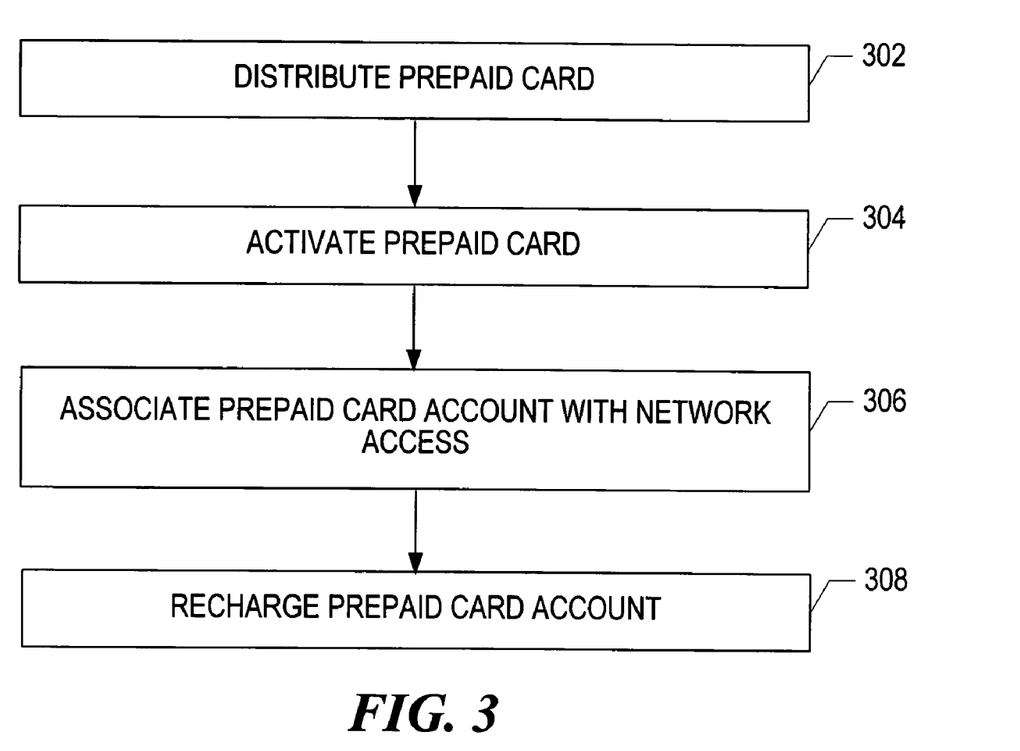

Referring to FIG. 3, a method for using and activating a prepaid card is illustrated. A prepaid calling card is distributed at 302 and the prepaid card is activated at 304. The activated prepaid card is associated with a prepaid card account and a network access point at 306. The prepaid card account may be recharged to provide further available telephony usage at 308.

Figure 4:
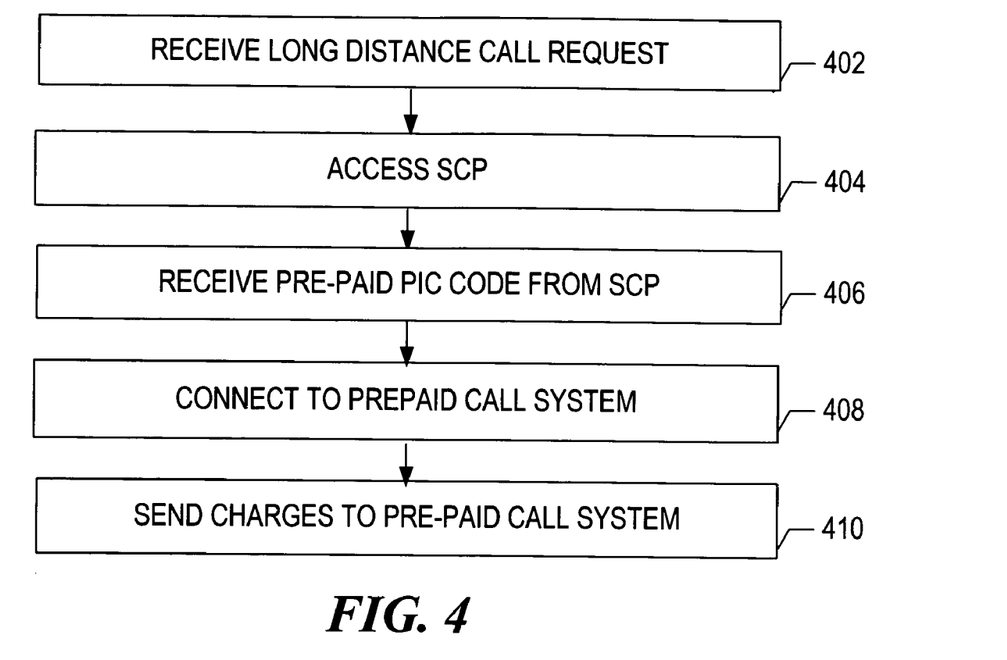

Referring to FIG. 4, a method of handling a long distance call where a prepaid calling system is used as illustrated. A long distance call request is received at 402. The long distance call request may be communicated over a telephony network such as a telephone communication system. A prepaid long distance service code may be retrieved from a switch control point that is coupled to the telephony network. For example, the switch control point may be accessed at 404 and the prepaid PIC code is received from the SCP at step 406. The call request is then connected to the prepaid calling system at 408, based on the prepaid PIC code. Charging information is sent to the prepaid calling system, at 410. In this manner, the PIC code from the switch control point is routed to the prepaid call system for selection of the appropriate long distance carrier to handle the prepaid call.

Figure 5:
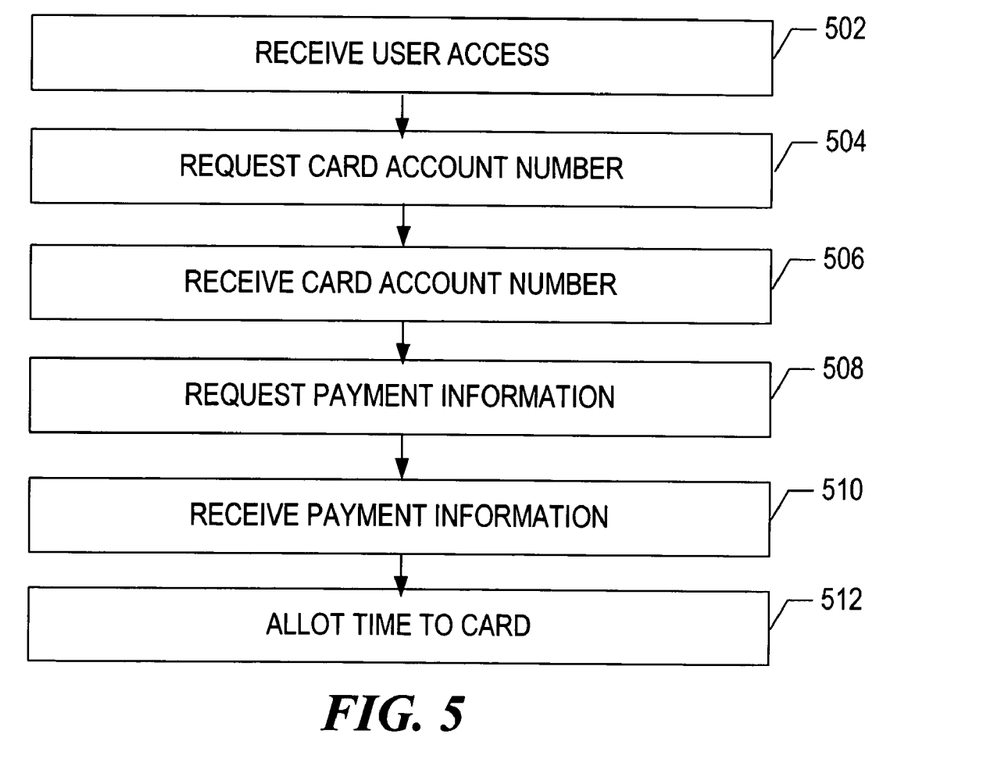

Referring to FIG. 5, a method of increasing units available in a prepaid calling card account is shown. A user receives access to the account at step 502 and a card account number is requested at step 504. The card account number is received at step 506 and a request for payment information is generated at step 508. The payment information is received at step 510 and time or other available units is allotted to the prepaid calling card at step 512. The payment information for recharging the prepaid card may be credit card information or may include a local telephone bill such as a local exchange carrier (LEC) account.

Figure 6:
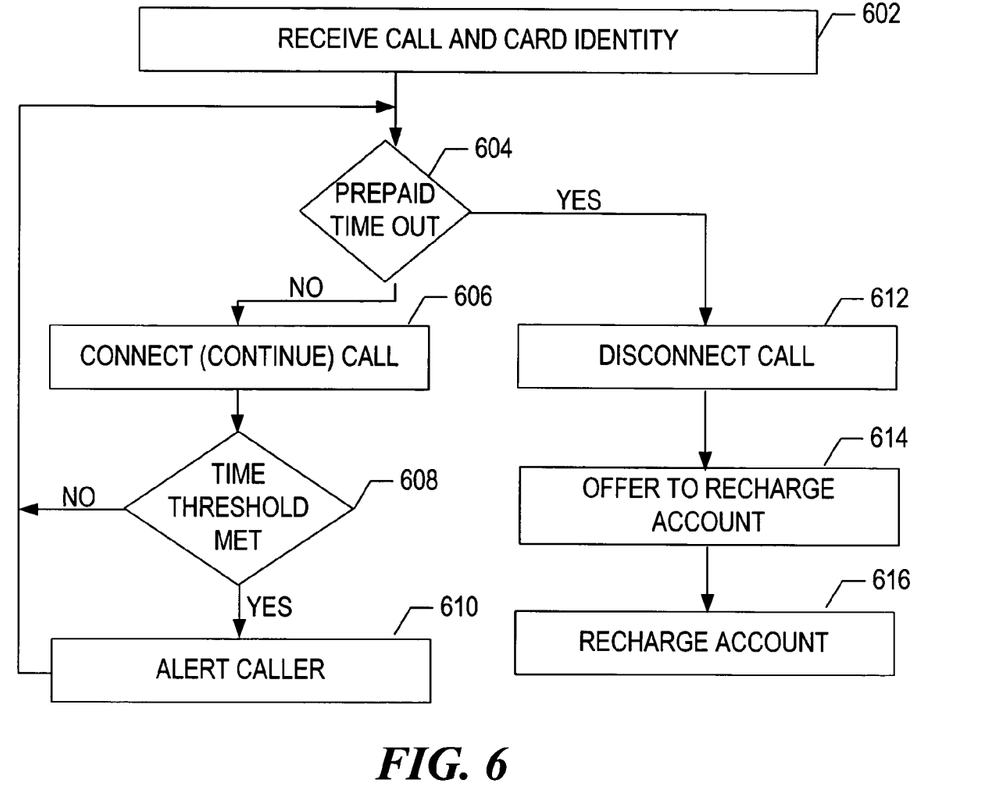

FIG. 6 illustrates an exemplary method of prepaid card use. A telephony system receives a call request and a card identity, as shown in step 602. For example, a card holder may call a primary access address such as a toll-free phone number. Alternately, the card holder may dial direct from home and be automatically connected to the telephony system. The telephony system may then prompt the card holder for a card number or identify the card number through a feature request.

Once the card is identified, the telephony system may test to determine whether prepaid time is available in an account associated with the calling card, as shown at step 604. If the prepaid time is available or is not out or expired, the call may be connected, as shown at step 606.

The system may then test to determine whether an alert time threshold has been met, as shown at step 608. The alert time threshold may, for example, be set at a number of minutes or an amount of dollars remaining in the account. When the remaining prepaid time or amount drops below the threshold, the system may alert the user, as shown at step 610. For example, the system may send a beep or alert sound to the receiver of the card holder. Alternately, a message may be played to the card hold indicating a number of minutes or amount of time remaining.

If the threshold test of step 608 is not met or the alert has been played, the system may test for remaining time again, as shown at step 604. Once the prepaid time or amount has expired, the call may be disconnect, as shown at step 612. The card holder may be prompted to recharge the account. If the user responds affirmatively, the account may be recharged. For example, the user may supply a credit card number for charging an additional prepaid amount. Alternately, if the card has been linked to a local telephone address, the card holder may authorize the recharge fee to been billed to the account. In one exemplary embodiment, the system would then test to determine if the local account is in good standing or test other credit worthiness related factors to determine whether recharging through local account billing is permissible. If payment or charge authorization is received, the system may recharge the account. In one exemplary embodiment, the system may then reconnect the call.

Figure 7:
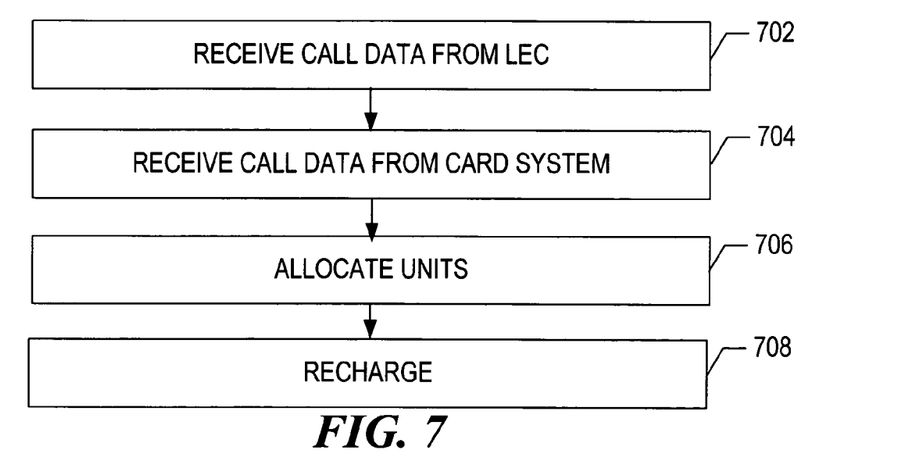

FIG. 7 depicts an exemplary method for managing a prepaid account. Call data is received from the local exchange carrier, as shown at step 702. Call data is also received from the card system, as shown at 704. Usage is allocated units from the prepaid units, as shown at step 706. For example, prepaid units may be minutes allocated to minutes of use. Alternately, monetary equivalents may be allocated to use based on a per unit time rate. In one embodiment, the system may receive authorization to recharge the account, as shown at step 708, through a credit card or through an associated local exchange carrier bill.

Figure 8A:
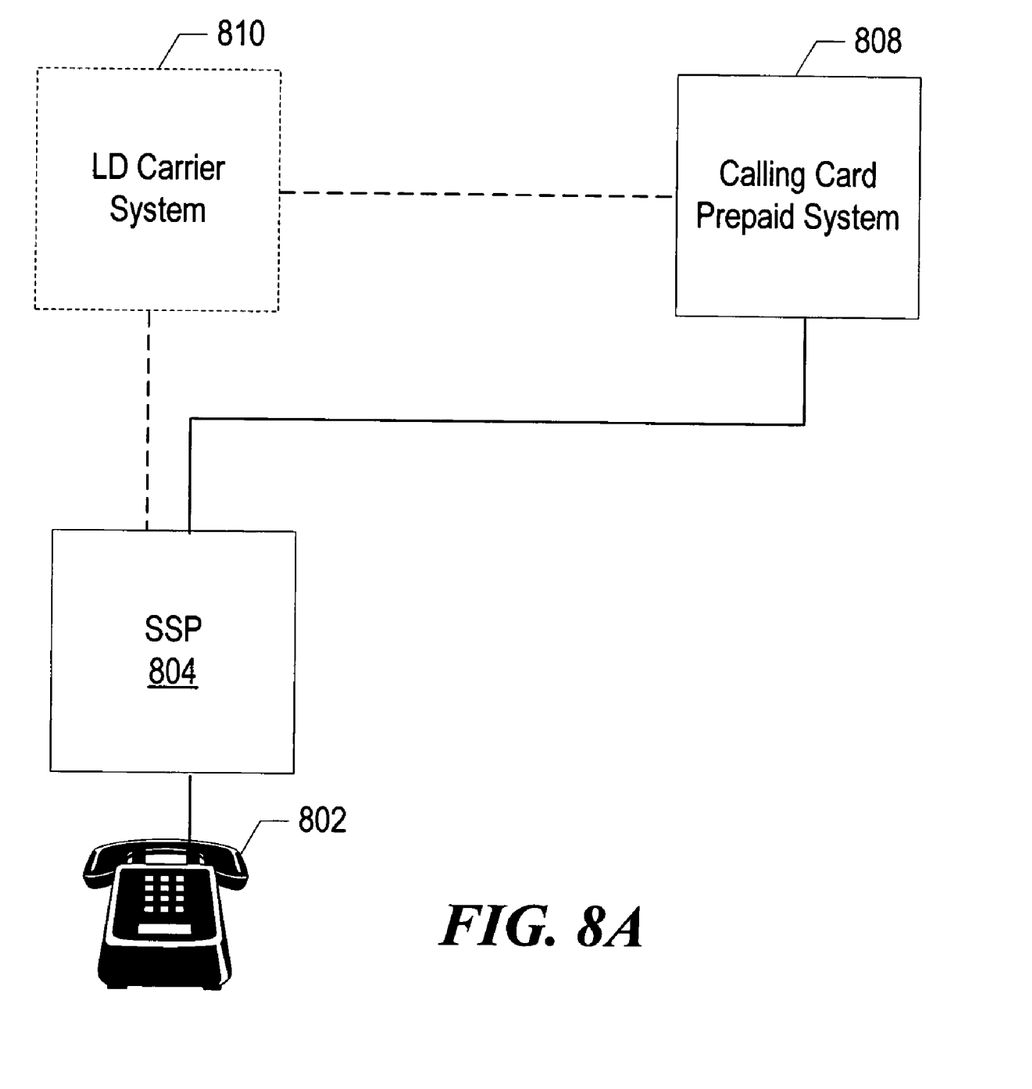
FIGS. 8A and 8B depict exemplary embodiments of a telephony network.

FIG. 8A illustrates an exemplary telephony system. A receiver 802 may have an associated network address and may access a service switch point 804. Long distance calls from the receiver 802 may be routed through the service switch point to a long distance carrier system 810 in accordance with a presubmitted interexchange carrier (PIC) code.

The receiver 802 may alternately have a prepaid presubmitted interexchange carrier (PIC) code associated with long distance service. When a direct dialed or one plus (1+) long distance call is made using the receiver 802, the service switch point 804 may determine which long distance service to use. In one exemplary embodiment, the service switch point 804 may access the long distance service via the calling card prepaid system 808. The calling card prepaid system 808 may then determine if time is available and selectively connect the call.

In an alternate embodiment, the service switch point 804 may access the long distance system 810. The long distance system 810 may perform a feature inquiry and access the calling card prepaid system 808 to determine service availability. Then, the long distance carrier system 810 may selectively connect the call.

Figure 8B:
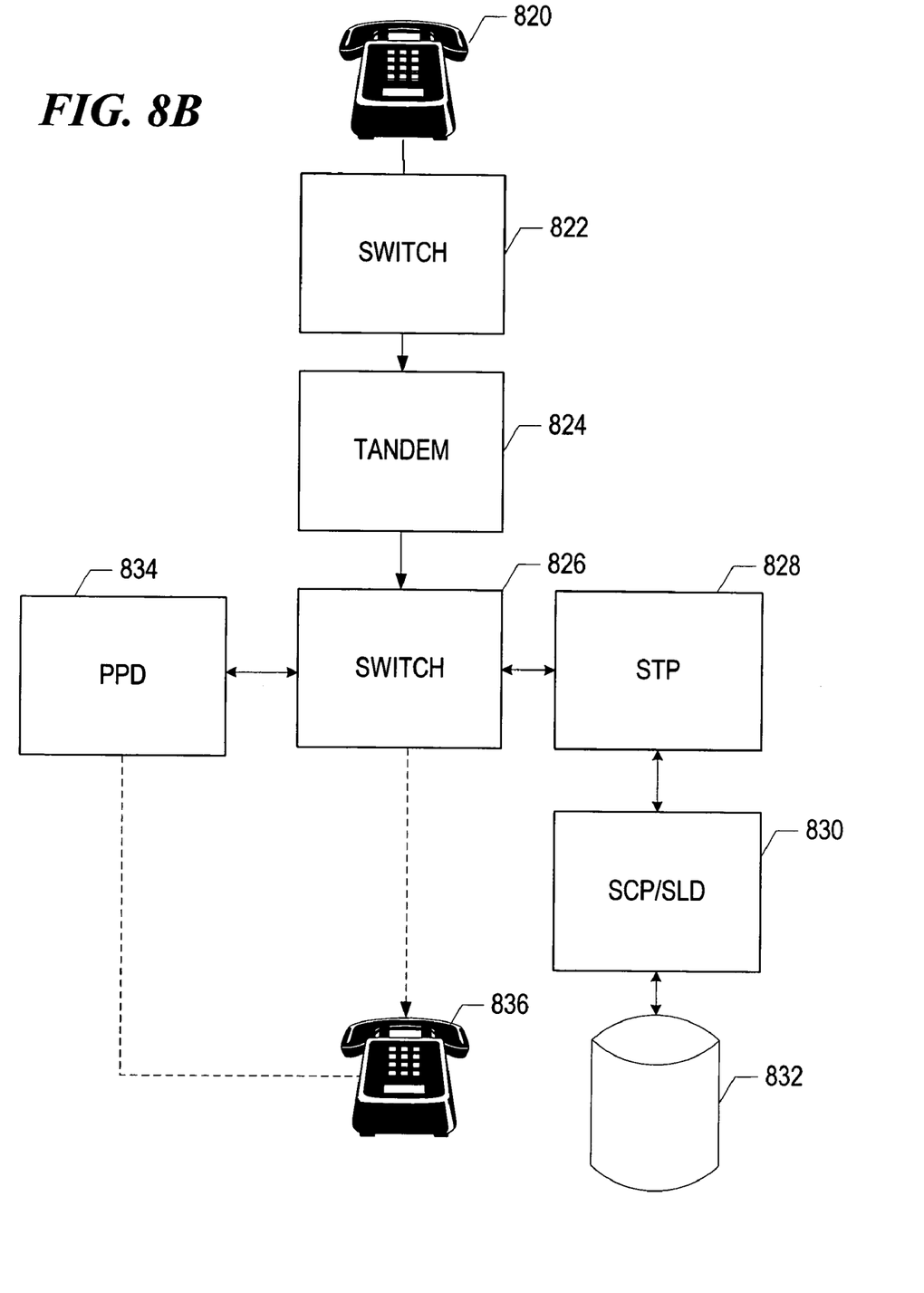

FIG. 8B illustrates an exemplary telephony system. A subscriber phone 820 access a switch 822 to initiate a call. If the subscriber dials a 1+ number and has an associated PIC, such as a prepaid PIC, the switch 822 accesses a Tandem 824 intermediary to the interexchange carrier. The tandem 824 selects a trunk line based on the prepaid PIC. A switch 826 located at the interexchange carrier determines account information and, if a balance is available, initiates the call to phone 836. In one exemplary embodiment, the switch 826 may include an AIN that triggers action on inbound trunk calls. The switch 826 may identify a subscriber using the subscribers phone number or other account information, for example. The switch 826 may access a SCP or SLD 830 through an STP 828. The SCP 830 may accesses a database 832 to determine account information, such as available time. The SCP 830 may further access the database 832 to store usage data. To inform a user of usage and provide whisper messages, the system may access a PPD 834 or an IVR.

In one exemplary embodiment, the system is an SS7 compatible system. In another exemplary embodiment, the system may be implemented as a Voice over Internet Protocol (VoIP) system with a gateway, softswitch, and media server. The media server may bridge in for mid-call supervision or implement a 3-way whisper.

Figure 9:
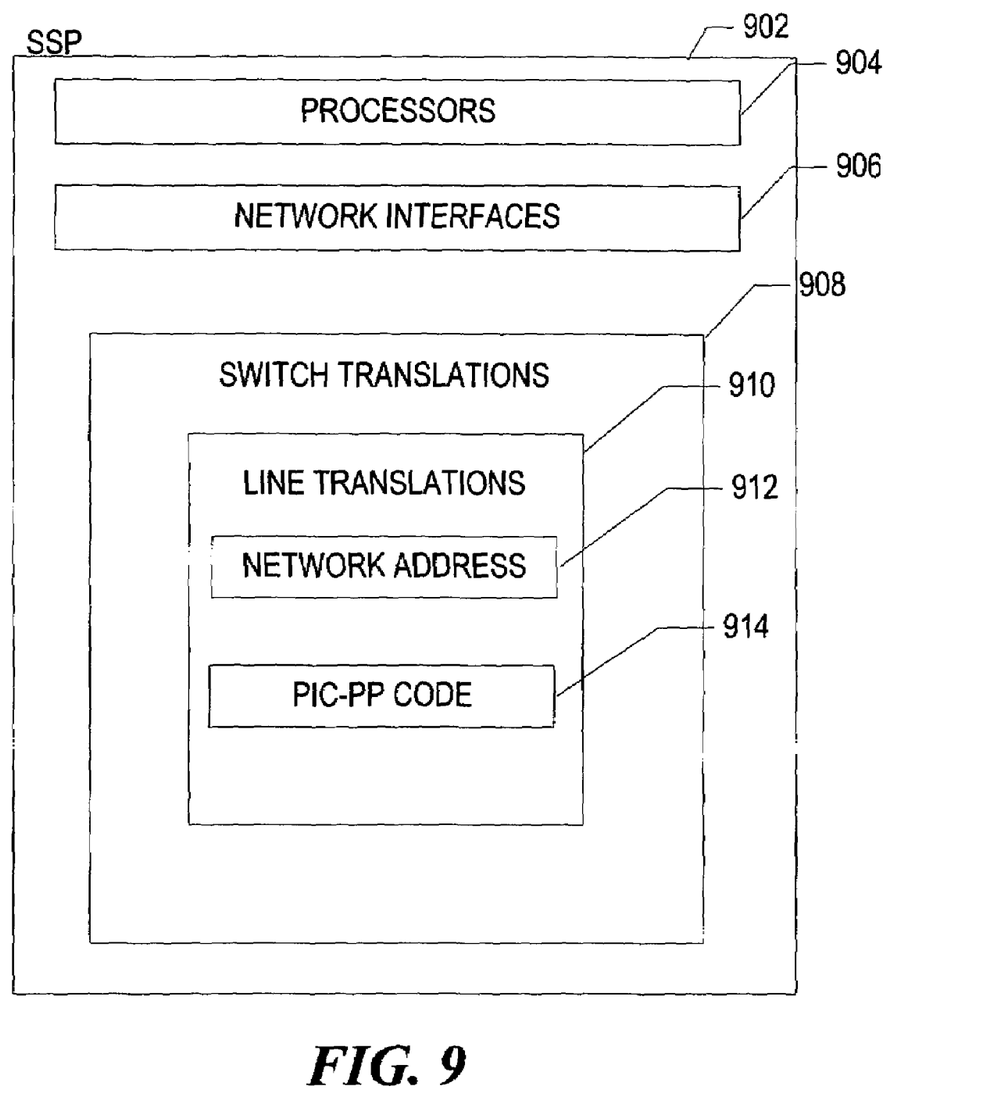
FIG. 9 depicts an exemplary embodiment of a service switch point.

FIG. 9 depicts an exemplary service switch point. The service switch point 902 includes one or more processors 904, one or more network interfaces 906, and switch translations 908. The switch translations 908 are computer readable memory for storing a line translation 910. The line translation 910 may include a network address such as a telephone number and an associated presubmitted interexchange carrier (PIC) code 914. The associated PIC code 914 may be a prepaid PIC code. When a caller places a long distance call from a network address matching the network address 912, the service control point 902 identifies the prepaid PIC code 912 and directs the use of the prepaid calling system in placing the call.

Figure 10:
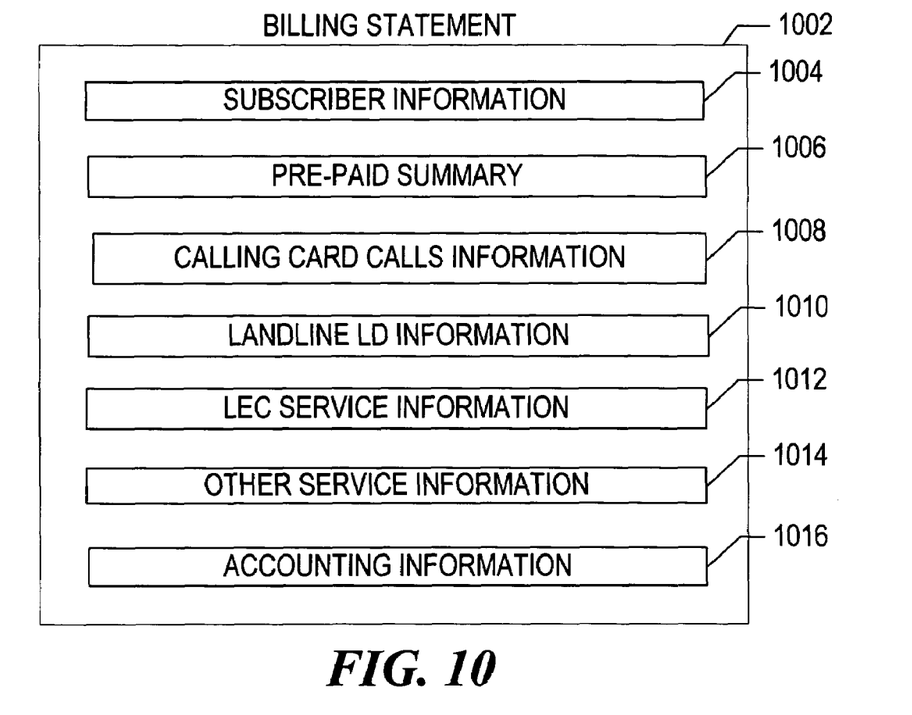
FIG. 10 depicts an exemplary billing statement.

FIG. 10 depicts an exemplary billing statement 1002 that includes subscriber information 1004, a prepaid summary 1006, calling card call information 1008, landline long distance information 1010, local exchange carrier (LEC) service information 1012, other service information 1014, and accounting information 1016.

The subscriber information 1004 may include a subscriber's mailing address, network address, name, and personal information. The prepaid summary 1006 may include information such as an amount of allotted units, unit usage, remaining units, and incremental additions of units. The calling card calls information 1008 may include data relating to phone calls made using the prepaid calling card at locations other than the network address. The landline long distance information 1010 may identify calls made from the network address using the prepaid card service.

The billing statement 1002 may also include LEC service information 1012 identifying charges for features associated with the network address. Other service information 1014 may identify charges associated with other services such as internet, cable, wireless, and wireless fidelity (WiFi) service. The accounting information 1016 may include a bill total, previous payments, and previous amounts owed.

Figure 11:
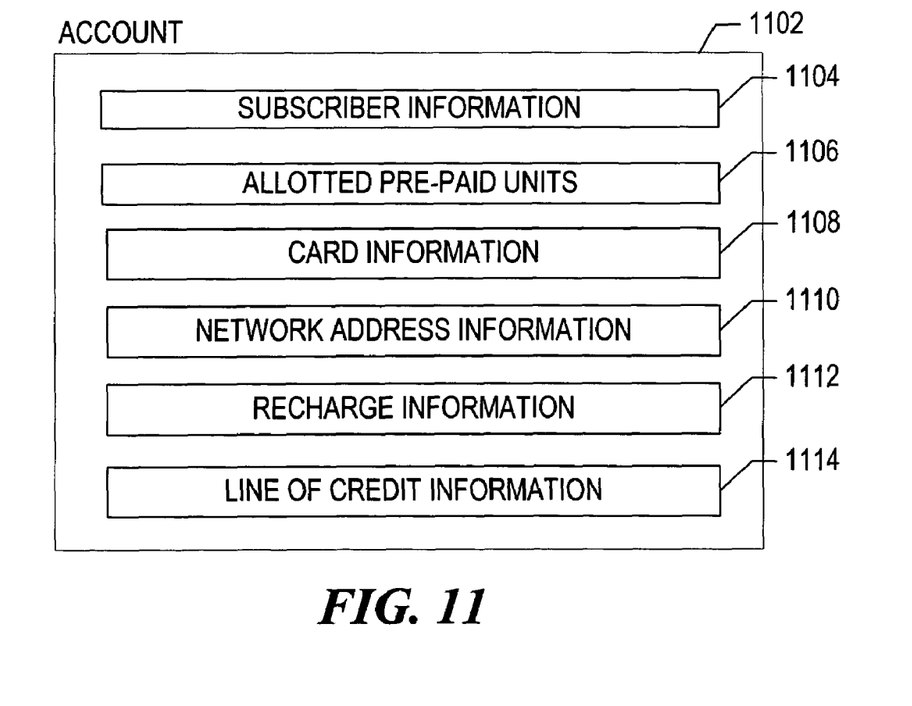
FIG. 11 depicts an exemplary account.

FIG. 11 depicts an exemplary account 1102. The account 1102 may include susbscriber information 1104, allotted prepaid units information 1106, card information 1108, network address information 1110, recharge information 1112, and line of credit information 1114. The subscriber information 1104 may include a subscriber's mailing address, network address, name, and personal information. The allotted prepaid units information 1106 may include an amount of remaining units for use in connection with a telephony service or WiFi service. The card information 1108 may include a card number and a personal identification number (PIN) or password. A network address may be associated with the prepaid account to permit direct dialing from the network address using the prepaid units. The network address information 1110 may include the network address and a specific password or PIN for accessing the prepaid service via that network address. A card holder may store credit card information or recharge preference information in the recharge information 1112. This information may be used to recharge a card via credit card or through billing an account associated with the network address. In one exemplary embodiment, the card may also have access to a line of credit. The line of credit may be used to access cash through an automated teller machine (ATM), pay for purchase like a credit card, or pay for prepaid minute recharging. Information 1114 associated with the line of credit may be stored in the account.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of activating a prepaid telephony account, the method comprising:
   receiving a call from a caller at a prepaid service destination address identified by a prepaid calling card;
   receiving a prepaid card number of the caller;
   receiving a destination number;
   receiving an origination address of the caller;
   providing a message to the caller including an offer to associate a prepaid account corresponding to the prepaid calling card with the origination address of the caller;
   receiving a response to the message from the caller; and
   associating a long distance service code with the origination address of the caller based on the response to the message.

2. The method of claim 1, wherein the long distance service code is a presubmitted interexchange carrier code.

3. The method of claim 1, further comprising connecting the call to the destination number.

4. The method of claim 1, wherein the call to the destination number is a long distance call.

5. The method of claim 1, further comprising:
   requesting a personal identification number from the caller;
   receiving the personal identification number from the caller; and
   storing the personal identification number.

6. The method of claim 1, further comprising evaluating the origination address with respect to an address criteria.

7. The method of claim 6, wherein the address criteria is used to screen payphones.

8. The method of claim 6, wherein the address criteria is used to identify customers of a particular service vendor.

9. The method of claim 1, wherein the origination address is associated with a subscriber residential telephone device.

10. The method of claim 1, further comprising:
    providing a second message to the caller, the message including a request to change long distance carriers.

11. The method of claim 1, further comprising:
    providing a second message to the caller, the message including a request to change local service providers.

12. The method of claim 1, further comprising prompting the caller to request the prepaid card number and the destination number.

13. The method of claim 1, further comprising assigning a prepaid class of service to a subscriber account identified by the origination address.

14. The method of claim 1, wherein providing the message to the caller includes providing an offer made by an automated prompt.

15. The method of claim 14, wherein the automated prompt comprises a computer-generated message from an interactive voice response unit.

16. The method of claim 1, wherein providing the message to the caller includes providing an offer communicated by a live human operator.

17. A prepaid account stored in a computer system, the prepaid account comprising:
    subscriber identity data;
    network address information associated with the subscriber identity data;
    prepaid usage data to identify a number of prepaid usage units available for use of a telephony service, the telephony service automatically accessible from a telephone network address identified by the network address information; and
    recharge information including local exchange carrier account information.

18. The prepaid account of claim 17, wherein additional prepaid usage units may be provided based on a payment status check of a subscriber associated with the local exchange carrier account information.

19. The prepaid account of claim 17, wherein the number of prepaid usage units are selectively increased based on a test of credit worthiness related factors.

* * * * *